(12) United States Patent
Maor et al.

(10) Patent No.: US 12,353,293 B2
(45) Date of Patent: Jul. 8, 2025

(54) PERFORMING A BACKUP IN RELATION TO A SEPARATED DATABASE

(71) Applicant: Pliops Ltd., Tel Aviv (IL)

(72) Inventors: Roey Maor, Tel Aviv (IL); Edward Bortnikov, Tel Aviv (IL); Eshcar Hillel, Tel-Aviv (IL); Michael Pan, Tel Aviv (IL); Moshe Twitto, Givat Shemuel (IL)

(73) Assignee: PLIOPS LTD., Tel Aviv (IL)

( * ) Notice: Subject to any disclaimer, the term of this patent is extended or adjusted under 35 U.S.C. 154(b) by 0 days.

(21) Appl. No.: 18/449,693

(22) Filed: Aug. 14, 2023

(65) Prior Publication Data

US 2023/0385158 A1 Nov. 30, 2023

Related U.S. Application Data

(63) Continuation-in-part of application No. 18/156,362, filed on Jan. 18, 2023, and a continuation-in-part of application No. 17/651,065, filed on Feb. 14, 2022, now Pat. No. 12,164,493.

(60) Provisional application No. 63/266,940, filed on Jan. 19, 2022.

(51) Int. Cl.
*G06F 11/14* (2006.01)
*G06F 16/22* (2019.01)

(52) U.S. Cl.
CPC ...... *G06F 11/1458* (2013.01); *G06F 16/2246* (2019.01); *G06F 2201/84* (2013.01)

(58) Field of Classification Search
CPC ............ G06F 11/1458; G06F 16/2246; G06F 11/1451; G06F 11/1471; G06F 2201/84; G06F 2201/80
See application file for complete search history.

(56) References Cited

U.S. PATENT DOCUMENTS

| | | | |
|---|---|---|---|
| 10,691,693 B2 * | 6/2020 | Fanghaenel | G06F 16/24552 |
| 2017/0149886 A1 * | 5/2017 | Shetty | G06F 3/065 |
| 2017/0344441 A1 * | 11/2017 | Horowitz | G06F 3/0673 |
| 2020/0183906 A1 * | 6/2020 | Spillane | G06F 16/86 |
| 2020/0201821 A1 * | 6/2020 | Wang | G06F 16/13 |
| 2020/0285399 A1 * | 9/2020 | Yang | G06F 16/2246 |
| 2020/0372005 A1 * | 11/2020 | Apte | G06F 16/2246 |
| 2020/0409583 A1 * | 12/2020 | Kusters | G06F 11/1612 |
| 2021/0326301 A1 * | 10/2021 | Vutukuri | G06F 16/1734 |
| 2022/0058094 A1 * | 2/2022 | Gunturu | G06F 11/1464 |
| 2022/0067004 A1 * | 3/2022 | Agrawal | G06F 16/214 |
| 2022/0156231 A1 * | 5/2022 | Wang | G06F 16/9027 |
| 2022/0197861 A1 * | 6/2022 | Wang | G06F 16/22 |
| 2022/0391291 A1 * | 12/2022 | Helland | G06F 16/2365 |

(Continued)

Primary Examiner — Huawen A Peng
(74) Attorney, Agent, or Firm — Reches Patents

(57) ABSTRACT

A method for performing a backup in relation to a separated database, the method includes creating, by a processing circuit, a new backup log structured merge (LSM) tree of the separated database, wherein the new backup LSM tree is associated with a new point in time (PIT) and belongs to a group of LSM trees that comprise a primary LSM tree and one or more backup LSM trees that are associated with different PITs, and share a key value (KV) database that is mutable and is separated from the group; wherein the creating comprises storing the new backup LSM tree to a destination.

20 Claims, 3 Drawing Sheets

(56) References Cited

U.S. PATENT DOCUMENTS

2023/0141205 A1* 5/2023 Agrawal ............... G06F 16/214
                                                               707/803
2023/0161672 A1* 5/2023 Raspudic ............. G06F 16/113
                                                               711/162

* cited by examiner

Creating, by a processing circuit, a new backup log structured merge (LSM) tree of the separated database. The new backup LSM tree is associated with a new point in time (PIT) and belongs to a group of LSM trees that comprise a primary LSM tree and one or more backup LSM trees that are associated with different PITs. The group of LSM trees share a key value (KV) database that is mutable and is separated from the group. 110

Performing a barriered flush of KV pairs stored in memory tables that are associated with PITs that do not exceed the new PITs. 111

Preventing a deletion or a modification, by one LSM tree of the group, of a value that is stored in the KV database and is required by another LSM tree of the group. 120

PERFORMING A BACKUP IN RELATION TO A SEPARATED DATABASE

CROSS REFERENCE

This application is a continuation in part (CIP) of U.S. patent application Ser. No. 17/651,065 filing date Feb. 9, 2022.

This application is a continuation in part (CIP) of U.S. patent application Ser. No. 18/156,362 filing date Jan. 18, 2023, which claims the benefit of U.S. provisional 63/266,940, filed Jan. 19, 2022.

BACKGROUND

A key-value (KV) pair is a way to represent data in storage systems. A value of the KV pair may be accessed using the key. The key and the value may be stored together. Alternatively—the keys may be separated from the values in order to reduce I/O amplification.

The separated database musk be backed up from time to time. The backup process is very slow and requires to copy entire files of LSM trees—either during the backup or after the backup is done and data changes.

There is a growing need to provide a solution that reduce the I/O amplification and exhibit low latency.

SUMMARY

There is provided a method, system and non-transitory computer readable medium for performing a backup in relation to a separated database.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 illustrates an example of a method.

DETAILED DESCRIPTION OF THE DRAWINGS

Figure 1:
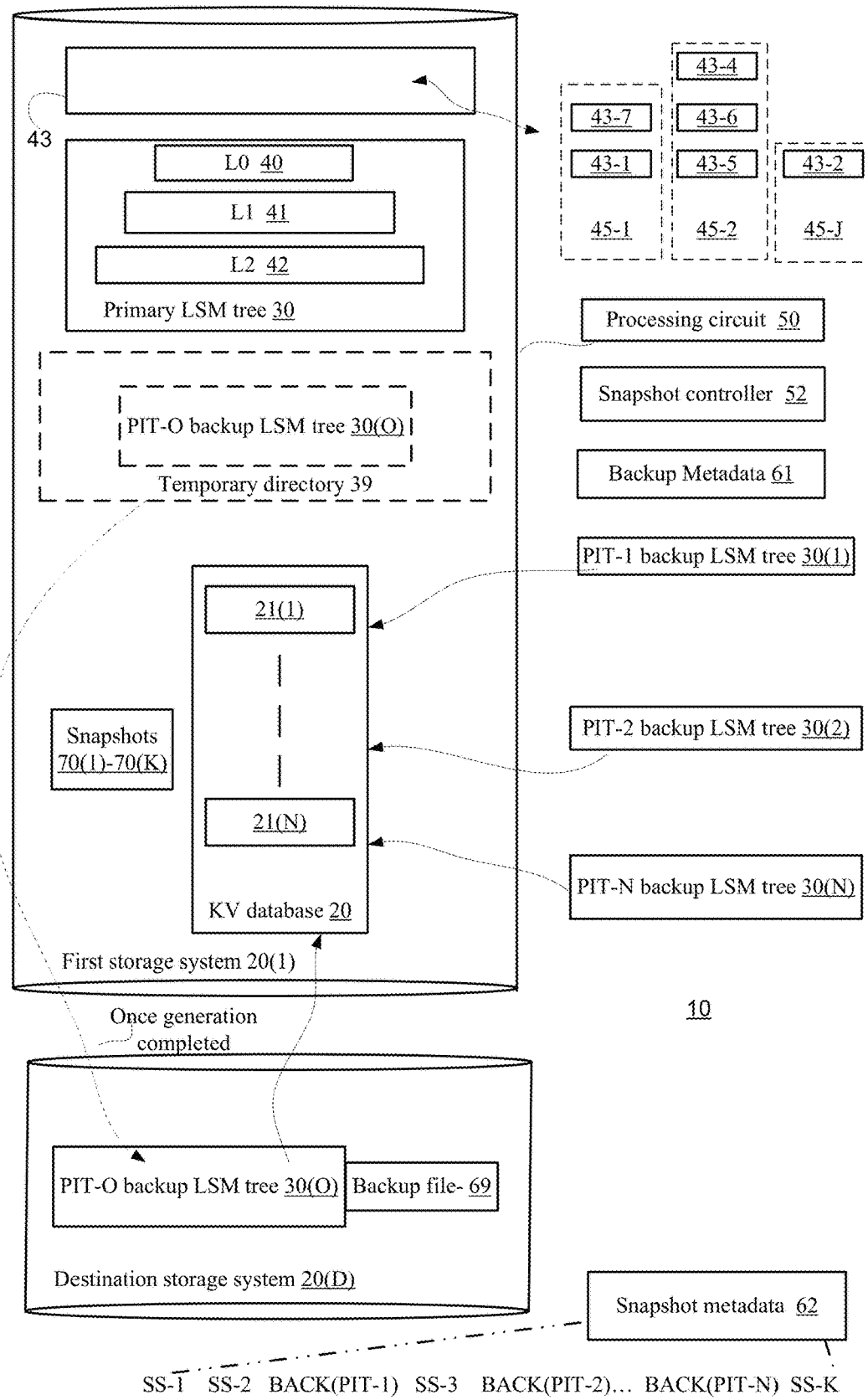
FIG. 1 illustrates an example of a separated database.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The specification and/or drawings may refer to a processing circuit. The processing circuit may be implemented as a hardware accelerator, as a memory controller, as a SSD memory controller, as a central processing unit (CPU), as a graphic accelerator, and/or one or more other integrated circuits such as application-specific integrated circuits (ASICs), field programmable gate arrays (FPGAs), full-custom integrated circuits, etc., or a combination of such integrated circuits. A system that may execute one or more of the methods and/or one or more steps of one or more methods may be a computerized system that may include one or more processor. For example—the system may be or may include a storage unit (for example—one or more SSD drives and one or more SSD memory controller.

There is provided a backup scheme in relation to a separated database. According to an embodiment—the separated database supports storage engine APIs such as (a) random write—put, delete, multiput (put/delete batch), (b) random read—get, multiget, (c) range scan—ordered iteration, and (d) range delete.

The backup scheme reduces the I/O and space amplification and exhibit a low latency.

FIG. 1 illustrates an example of a separated database 10 that includes a KV database 20 and, a primary LSM tree 30, multiple backup LSM trees—such as N different backup LSM trees (PIT-1 backup LSM tree 30(1) till PIT-N backup LSM tree 30(N)), and a new backup LSM tree (PIT-O backup LSM tree 30(O).

The backup LSM trees provide a backup (for example a snapshot) of the primary LSM tree at different points in time.

The primary LSM tree 30, the N different multiple backup LSM trees and the new backup LSM tree (once completed) share KV database 20.

FIG. 1 also illustrates a buffer 43—which may include memory tables ("memtables") the buffer may be stored in memory while the primary LSM tree 30 is stored in storage. The buffer may be implemented by one or more solid state drive (SSD) pages.

The primary LSM tree 30 is illustrates as including three LSM tree layers L0 40, L1 41, L2 42, and buffer 43 (buffer. There may be two LSM tree layers or more than three layers.

FIG. 1 also illustrates that the buffer 43 stores content in column families 45-1 till 45-J, each column family may store multiple memory tables—see 43-1, 43-2, 43-5, 43-6 and 43-7.

FIG. 1 illustrates that a first storage system 20(1) stores the KV database 20, the primary LSM tree 30 and intermediate parts of the PIT-O backup LSM tree 30(O)—until the completion of the creation of PIT-O backup LSM tree 30(O) and the sending to the PIT-O backup LSM tree 30(O) to a destination—that is illustrated as being located within destination storage system 20(D). Each LSM tree of the group is independently opened.

The other backup LSM trees may be stored in their destinations—which may be any storage system—including the first storage system, the destination storage system or any other destination storage system.

FIG. 1 also illustrates files and/or metadata such as snapshots 70(1)-70(K) managed by snapshot controller 52, processing circuit 50 that may operate as a backup controller, backup metadata 61 which is metadata required for backups, snapshot metadata 62 which is metadata required for snapshots (for example list of maintained snapshots including snapshots such as SS-1 till SS-K, and backups protected under the snapshot mechanism—such as N backups represented by BACK(PIT-1) till BACK(PIT-N)), and backup file 69 that describes PIT-O backup LSM tree 30(O). Once successfully generated—the snapshot metadata will also include BACK(PIT-O). The snapshot controller may be an integrated circuit, a part of an integrated circuit, may include more than a single integrated circuit.

The KV database 20 may be accessed by access keys.

FIG. 2 is an example of method 100 for performing a backup in relation to a separated database.

According to an embodiment method 100 includes step 110 of creating, by a processing circuit, a new backup log structured merge (LSM) tree of the separated database. The new backup LSM tree is associated with a new point in time (PIT) and belongs to a group of LSM trees that comprise a primary LSM tree and one or more backup LSM trees that are associated with different PITs. The group of LSM trees share a key value (KV) database that is mutable and is separated from the group.

Step 110 includes storing the new backup LSM tree to a destination—once the generation of the new backup LSM tree is completed.

According to an embodiment, the new backup LSM tree provides a persistent checkpoint of the separated database.

Step 110 may be executed using a journal of the separated database. Using the snapshot mechanism may allow to skip the usage of the journal.

Due to the separation between the KV database and the LSM tees—step 110 includes writing keys related to the new PIT to a destination, without writing values associated with the keys related to the new PIT to the destination.

According to an embodiment, step 110 includes creating a backup file such as a new backup LSM tree metadata that includes an identifier of the new PIT, an identifier of the group, and a group status indicator.

According to an embodiment, step 110 includes step 111 of performing a barriered flush of KV pairs stored in memory tables (such as memory tables 43-1 till 43-7 of FIG. 1) that are associated with PITs that do not exceed the new PITs. For example the first till N'th PITs.

The performing of the barriered flush includes flushing the KV pairs to a primary LSM tree of the group. For example flushing the KV pairs from buffer 43 to L0 40. The flushing applying a copy on write scheme in which only the KV values that were changed from the previous backup are flushed—which is highly effective—as there is no need to copy entire LSM files—which reduces the consumption of memory and/or processing resources.

The KV pairs may be stored in different column families and the barriered flush is applied on the different column families.

The barriered flush solves various problems such as the race between value protection and the reception of new KV pairs, data gap portions related to the storage of KV pairs at different column families, and the eager flush problem due to the asynchronous flushing of the memory tables—between the time we generate a flush request and insert it to the request queue, and until the flush request is actually done, there could be new memory tables that were added and marked for flush, so we would flush them as well even if we did not intend to.

The barriered flush can be regarded as a non-eager flush in which only selected content (according to the barrier) are flushed.

The barriered flush stalls writing new information to memory tables involves in the barriered flush for a very short period—for example less than a second, less that a few seconds—for example shorter than a duration of an execution of a user requested operation—so it will not be noticed by a user. This provides a highly effective mechanism that dramatically decreases the amount of computational and memory resources required to provide backups—especially checkpoints of the separated database. By using the snapshot mechanism—the resources solely dedicated to the generation of the backups are dramatically reduced.

Figure 3:
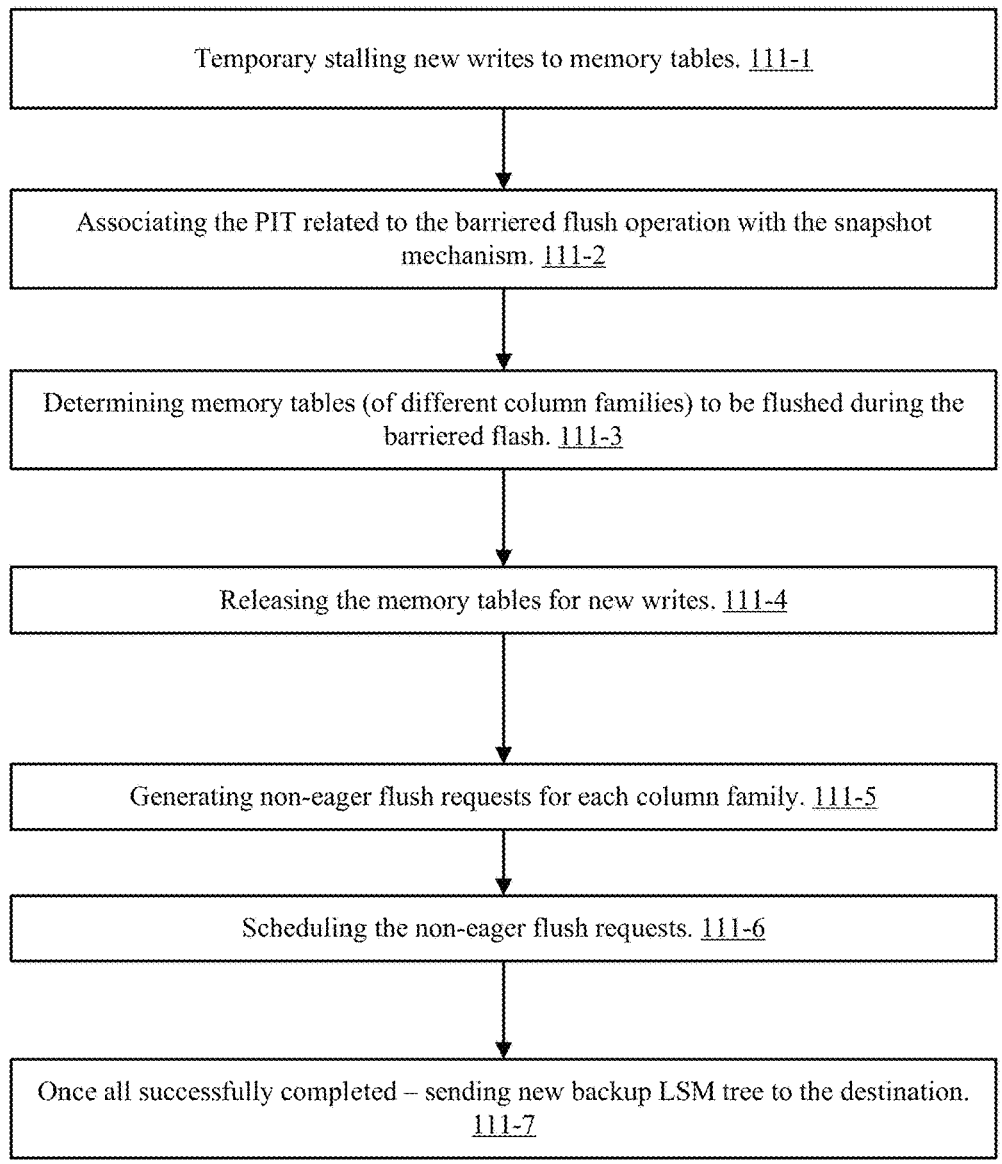
FIG. 3 illustrates an example of a step of the method of FIG. 2.

A barriered flush may include (see FIG. 3—steps 111-1, 111-,2 111-3, 111-4, 111-5, 111-6 and 111-7):

a. Temporary stalling new writes to memory tables.

b. Associating the PIT related to the barriered flush operation with the snapshot mechanism. For example—add BACK(PIT-O) to the snapshot metadata.

c. Determine memory tables (of different column families) to be flushed during the barriered flash. For example—the maximal ID memory table per column family to be flushed. The memory tables of the same column family and having an ID smaller than the IS of the maximal ID memory table are also flushed.

d. Release the memory tables for new writes.

e. Generate non-eager flush requests for each column family.

f. Schedule the non-eager flush requests.

g. Once all successfully completed—sending new backup LSM tree to the destination.

Steps (a)-(d) are very short are do not impact any other process of the storage system. Steps (e)-(f) may be executed as ease—without urgency (without interrupting other processes of the storage system)—which also improves the efficiency of (and reduces resources required to) executing these steps.

According to an embodiment, method 100 includes step 120 of preventing a deletion or a modification, by one LSM tree of the group, of a value that is stored in the KV database and is required by another LSM tree of the group.

According to an embodiment, step 120 uses a snapshot mechanism. The snapshot mechanism protects values associated with different points in time until it is determined (for example by a user) that the values may be deleted—for example belong to a point of time that is not relevant.

According to an embodiment, step 120 includes managing, by using a snapshot mechanism, values that are stored in the KV database, and are related to one or more LSM trees of the.

While FIGS. 1 and 2 referred to a group of LSM trees, they are applicable, mutatis mutandis to multiple groups of LSM trees, whereas different groups of LSM trees differ from each other by their primary LSM trees. One or more storage systems may store one or more groups of LSM trees.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for performing a backup in relation to a separated database, the method comprises:
creating, by a processing circuit, a new backup log structured merge (LSM) tree of the separated database, wherein the new backup LSM tree is associated with a new point in time (PIT) and belongs to a group of LSM trees that comprise a primary LSM tree and backup LSM trees that are associated with different PITs, and share a key value (KV) database that is mutable and is separated from the group; wherein the creating comprises storing the new backup LSM tree to a destination and performing a barriered flush of KV pairs stored in memory tables that are associated with PITs that do not exceed the new PITs, wherein the barrier flush comprises temporary stalling new writes to memory tables and associating the PIT related to the barriered flush operation with a snapshot mechanism.

2. The method according to claim 1, wherein the new backup LSM tree provides a persistent checkpoint of the separated database.

3. The method according to claim 1, comprising preventing a deletion or a modification, by one LSM tree of the group, of a value that is stored in the KV database and is required by another LSM tree of the group.

4. The method according to claim 3, wherein the preventing uses a snapshot mechanism.

5. The method according to claim 1, comprising managing, by using a snapshot mechanism, values that are stored in the KV database, and are related to one or more LSM trees of the group.

6. The method according to claim 1, wherein the creating of the new backup LSM tree is executed without using a journal of the separated database.

7. The method according to claim 1, wherein the creating of the new backup LSM tree comprises writing keys related to the new PIT to a destination, without writing values associated with the keys related to the new PIT to the destination.

8. The method according to claim 1, wherein the creating of the new backup LSM tree comprises creating a new backup LSM tree metadata that comprises an identifier of the new PIT, an identifier of the group, and a group status indicator.

9. The method according to claim 1, wherein the performing of the barriered flash further comprises (a) determining memory tables of different column families to be flushed during the barriered flash, (b) releasing the memory tables for new writes, (c) generating non-eager flush requests for each column family, and (d) scheduling the non-eager flush requests.

10. The method according to claim 9, wherein the performing of the barriered flush comprises flushing the KV pairs to a primary LSM tree of the group.

11. A non-transitory computer readable medium for performing a backup in relation to a separated database, the non-transitory computer readable medium stores instructions that once executed by a processing circuit caused the processing circuit to: create a new backup log structured merge (LSM) tree of the separated database, wherein the new backup LSM tree is associated with a new point in time (PIT) and belongs to a group of LSM trees that comprise a primary LSM tree and backup LSM trees that are associated with different PITs, and share a key value (KV) database that is mutable and is separated from the group; wherein the creating comprises storing the new backup LSM tree to a destination and performing a barriered flush of KV pairs stored in memory tables that are associated with PITs that do not exceed the new PITs, wherein the barrier flush comprises temporary stalling new writes to memory tables and associating the PIT related to the barriered flush operation with a snapshot mechanism.

12. The non-transitory computer readable medium according to claim 11, wherein the new backup LSM tree provides a persistent checkpoint of the separated database.

13. The non-transitory computer readable medium according to claim 11, that stores instructions for preventing a deletion or a modification, by one LSM tree of the group, of a value that is stored in the KV database and is required by another LSM tree of the group.

14. The non-transitory computer readable medium according to claim 13, wherein the preventing uses a snapshot mechanism.

15. The non-transitory computer readable medium according to claim 11, that stores instructions for managing, by using a snapshot mechanism, values that are stored in the KV database, and are related to one or more LSM trees of the group.

16. The non-transitory computer readable medium according to claim 11, wherein the creating of the new backup LSM tree is executed without using a journal of the separated database.

17. The non-transitory computer readable medium according to claim 11, wherein the creating of the new backup LSM tree comprises writing keys related to the new PIT to a destination, without writing values associated with the keys related to the new PIT to the destination.

18. The non-transitory computer readable medium according to claim 11, wherein the creating of the new backup LSM tree comprises creating a new backup LSM tree metadata that comprises an identifier of the new PIT, an identifier of the group, and a group status indicator.

19. The non-transitory computer readable medium according to claim 11, wherein the performing of the barriered flash further comprises (a) determining memory tables of different column families to be flushed during the barriered flash, (b) releasing the memory tables for new writes, (c) generating non-eager flush requests for each column family, and (d) scheduling the non-eager flush requests.

20. A storage system comprising a processing circuit that is configured to create a new backup log structured merge (LSM) tree of the separated database, wherein the new backup LSM tree is associated with a new point in time (PIT) and belongs to a group of LSM trees that comprise a primary LSM tree and backup LSM trees that are associated with different PITs, and share a key value (KV) database that is mutable and is separated from the group; wherein the creating comprises storing the new backup LSM tree to a destination, and performing a barriered flush of KV pairs stored in memory tables that are associated with PITs that do not exceed the new PITs, wherein the barrier flush comprises temporary stalling new writes to memory tables and associating the PIT related to the barriered flush operation with a snapshot mechanism.

\* \* \* \* \*